United States Patent
Lawson et al.

(10) Patent No.: US 12,035,106 B2
(45) Date of Patent: Jul. 9, 2024

(54) MACHINE LEARNING MODEL CAPABILITY ASSESSMENT

(71) Applicant: SRI International, Menlo Park, CA (US)

(72) Inventors: Aaron Lawson, San Jose, CA (US); Mitchell L McLaren, Everton Park (AU); Diego Castan Lavilla, Dobbs Ferry, NY (US)

(73) Assignee: SRI INTERNATIONAL, Menlo Park, CA (US)

( * ) Notice: Subject to any disclaimer, the term of this patent is extended or adjusted under 35 U.S.C. 154(b) by 338 days.

(21) Appl. No.: 17/508,365

(22) Filed: Oct. 22, 2021

(65) Prior Publication Data

US 2022/0044077 A1    Feb. 10, 2022

Related U.S. Application Data

(60) Provisional application No. 63/126,117, filed on Dec. 16, 2020.

(51) Int. Cl.
*H04R 25/00*  (2006.01)
*G06F 18/21*  (2023.01)
(Continued)

(52) U.S. Cl.
CPC ......... *H04R 25/453* (2013.01); *G06F 18/214* (2023.01); *G06F 18/2185* (2023.01);
(Continued)

(58) Field of Classification Search
CPC .. H04R 25/453; H04R 2225/41; G06N 20/00; G06F 18/2185; G06F 18/2413; G06F 18/214
See application file for complete search history.

(56) References Cited

U.S. PATENT DOCUMENTS 9,147,401 B2    9/2015  Shriberg et al.
10,133,538 B2  11/2018  McLaren et al.
(Continued)

OTHER PUBLICATIONS

Boril et al., "Unsupervised Equalization of Lombard Effect for Speech Recognition in Noisy Adverse Environments," IEEE Transactions Audio, Speech, and Language Processing, vol. 18, No. 6, Aug. 2010, pp. 1379-1393.
(Continued)

*Primary Examiner* — Utpal D Shah
(74) *Attorney, Agent, or Firm* — Shumaker & Sieffert, P.A.

(57) ABSTRACT

In some examples, a system includes a storage device; and processing circuitry having access to the storage device. The processing circuitry is configured to receive information indicative of a media dataset, where the media dataset corresponds to an object; and analyze the media dataset to compute a corresponding set of operating condition weight values. Additionally, the processing circuitry is configured to compare the set of operating condition weight values corresponding to the media dataset with a plurality of sets of reference operating condition weight values that each correspond to a different reference media dataset of a plurality of reference media datasets; and determine, based on the comparison of the set of operating condition weight values with the plurality of sets of reference operating condition weight values, an indication of a capability of a trained machine learning model to correctly verify the object in the media dataset.

20 Claims, 5 Drawing Sheets

(51) Int. Cl.
*G06F 18/214* (2023.01)
*G06F 18/2413* (2023.01)
*G06N 20/00* (2019.01)

(52) U.S. Cl.
CPC ......... *G06F 18/2413* (2023.01); *G06N 20/00* (2019.01); *H04R 2225/41* (2013.01)

(56) References Cited

U.S. PATENT DOCUMENTS

| | | | |
|---|---|---|---|
| 10,476,872 B2 | 11/2019 | McLaren et al. | |
| 11,024,291 B2 | 6/2021 | Castan Lavilla et al. | |
| 2014/0278412 A1 | 9/2014 | Scheffer et al. | |
| 2016/0248768 A1* | 8/2016 | McLaren | G10L 17/22 |
| 2016/0283185 A1* | 9/2016 | McLaren | G06F 16/683 |
| 2019/0013013 A1* | 1/2019 | McLaren | G10L 15/10 |
| 2021/0089907 A1* | 3/2021 | Rogers | G06F 18/2413 |

OTHER PUBLICATIONS

Bou-Ghazale et al., "A Comparative Study of Traditional and Newly Proposed Features for Recognition of Speech Under Stress," IEEE Transactions on Speech & Audio Processing, vol. 8, No. 4, Jul. 2000, pp. 429-442.

Bou-Ghazale et al., "HMM-Based Stressed Speech Modeling with Application to Improved Synthesis and Recognition of Isolated Speech Under Stress," IEEE Transactions on Speech & Audio Processing, vol. 6, No. 3, May 1998, pp. 201-216.

Fan et al., "Acoustic Analysis and Feature Transformation from Neutral to Whisper for Speaker Identification within Whispered Speech Audio Streams," Speech Communication, vol. 55, Jan. 2013, pp. 119-134.

Fan et al., "Speaker Identification within Whispered Speech Audio Streams," IEEE Transactions Audio, Speech and Language Processing, vol. 19, No. 5, Jul. 2011, pp. 1408-1421.

Ferrer et al., "A Noise-Robust System for NIST 2012 Speaker Recognition Evaluation," SRI International Menlo Park CA Speech Technology and Research Laboratory, Aug. 2013, 6 pp.

Ferrer et al., "A Unified Approach for Audio Characterization and its Application to Speaker Recognition," Odyssey 2012—The Speaker and Language Recognition Workshop, Singapore, 2012, 7 pp. (Applicant points out, in accordance with MPEP 609.04(a), that the year of publication, 2012, is sufficiently earlier than the effective U.S. filing date, so that the particular month of publication is not in issue.).

Ferrer et al., "Promoting robustness for speaker modeling in the community: the PRISM evaluation set," Proceedings of NIST 2011 workshop, Atlanta, Dec. 2011, 7 pp.

Ghaffarzadegan et al., "Generative Modeling of Pseudo-Whisper for Robust Whispered Speech Recognition," IEEE Transactions Audio, Speech, and Language Processing, vol. 24, No. 10, Oct. 2016, pp. 1705-1720.

Ghaffarzadegan et al., "UT-Vocal Effort II: Analysis and Constrained-Lexicon Recognition of Whispered Speech," 2014 IEEE International Conference on Acoustics, Speech and Signal Processing (ICASSP), Florence, Italy, May 4-9, 2014, pp. 2563-2567.

Godin et al., "Analysis of the effects of physical task stress on the speech signal," Journal of the Acoustical Society of America, vol. 130, No. 6, Dec. 2011, pp. 3992-3998.

Hansen et al., "Analysis and Compensation of Lombard Speech Across Noise Type and Levels With Application to In-Set/Out-of-Set Speaker Recognition," IEEE Transactions Audio, Speech & Language Processing, vol. 17, No. 2, Feb. 2009, pp. 366-378.

Hansen et al., "Feature Analysis and Neural Network based Classification of Speech under Stress," IEEE Transactions on Speech & Audio Processing, vol. 4, No. 4, Jul. 1996, pp. 307-313.

Hansen et al., "Speaker Recognition by Machines and Humans: A Tutorial Review," IEEE Signal Processing Magazine, Nov. 2015, pp. 74-99.

Hansen et al., "TEO-based Speaker Stress Assessment using Hybrid Classification and Tracking Schemes," International Journal Speech Technology, vol. 15, Issue 3, Sep. 2012, pp. 295-311.

Hansen, "Analysis and Compensation of Speech under Stress and Noise for Environmental Robustness in Speech Recognition," Speech Communication, Special Issue on Speech Under Stress, vol. 20(2), Nov. 1996, pp. 151-173.

Hansen, "Getting Started with SUSAS: A Speech Under Simulated and Actual Stress Database," Eurospeech, vol. 4, Rhodes, Greece, Sep. 1997, 4 pp.

Hansen, "Robust Emotional Stressed Speech Detection using Weighted Frequency Subbands," EURASIP Journal on Advances in Signal Processing: Special Issue on Emotion and Mental State Recognition from Speech, Apr. 2011, 10 pp.

Hansen, et al., "Driver Modeling for Detection & Assessment of Driver Distraction: Examples from the UTDrive Test Bed," IEEE Signal Processing Magazine, Jul. 2017, 13 pp.

Kaushik et al., "Automatic Sentiment Detection in Naturalistic Audio," IEEE Transactions on Audio, Speech, and Language Processing, vol. 25, No. 8, Aug. 2017, pp. 1668-1679.

Kaushik et al., "Automatic Audio Sentiment Extraction Using Keyword Spotting," Sixteenth Annual Conference of the International Speech Communication Association, Sep. 6-10, 2015, 5 pp.

Lawson et al., "Long Term Examination of Intra-Session and Inter-Session Speaker Variability," Research Associates for Defense Conversion (RADC), Marcy, NY, Mar. 2009, 4 pp.

Lei et al., "A Deep Neural Network Speaker Verification System Targeting Microphone Speech," Fifteenth Annual Conference of the International Speech Communication Association, Sep. 2014, pp. 681-685.

Lei et al., "A novel scheme for speaker recognition using a phonetically-aware deep neural network," 2014 IEEE International Conference on Acoustics, Speech and Signal Processing (ICASSP), May 2014, 6 pp.

Lei et al., "Simplified VTS-based i-vector extraction in noise-robust speaker recognition," 2014 IEEE International Conference on Acoustics, Speech and Signal Processing (ICASSP), May 2014. 5 pp.

Mariooryad et al., "Exploring cross-modality affective reactions for audiovisual emotion recognition," IEEE Transactions on Affective Computing, vol. 4, No. 2, Jan. 2013, 15 pp.

McLaren et al. "Combining Continuous Progressive Model adaptation and Factor Analysis for Speaker Verification," Proceedings of the 9th Annual Conference of the International Speech Communication Association (Interspeech 2008) incorporating the 12th Australasian International Conference on Speech Science and Technology, International Speech Communication Association, Sep. 2008, pp. 857-860.

McLaren et al. "Application of convolutional neural networks to speaker recognition in noisy conditions," Fifteenth Annual Conference of the International Speech Communication Association, Sep. 2014, pp. 686-690.

McLaren et al., "A Comparison of Session Variability Compensation Approaches for Speaker Verification" IEEE Transactions on Information Forensics and Security, vol. 5. No. 4, Aug. 2010, 8 pp.

McLaren et al., "Advances in Deep Neural Network Approaches to Speaker Recognition," 2015 IEEE international conference on acoustics, speech and signal processing (ICASSP), Apr. 2015, pp. 4814-4818.

McLaren et al., "Exploring the Role of Phonetic Bottleneck Features for Speaker and Language Recognition," 2016 IEEE International Conference on Acoustics, Speech and Signal Processing (ICASSP), Mar. 2016, pp. 5575-5579.

McLaren et al., "Improved Speaker Recognition Using DCT Coefficients as Features," 2015 IEEE International Conference on Acoustics, Speech and Signal Processing (ICASSP), Apr. 2015, pp. 4430-4434.

McLaren et al., "On the Issue of Calibration in DNNbased Speaker Recognition Systems," Interspeech, Sep. 2016, pp. 1825-1829.

McLaren et al., "Softsad: Integrated Frame-Based Speech Confidence for Speaker Recognition", IEEE International Conference on Acoustics, Apr. 19, 2015, 5 pp.

(56) References Cited

OTHER PUBLICATIONS

McLaren et al., "Trial-Based Calibration for Speaker Recognition in Unseen Conditions," Odyssey 2014: The Speaker and Language Recognition Workshop, Joensuu, Finland, Jun. 16-19, 2014, pp. 19-25.

McLaren et al., "Effective use of DCTs for Contextualizing Features for Speaker Recognition," 2014 IEEE International Conference on Acoustics, Speech and Signal Processing (ICASSP), May 2014, pp. 4027-4031.

McLaren et al., "Improving robustness to compressed speech in speaker recognition," Interspeech, Aug. 2013, pp. 3698-3702.

McLaren, "Data-driven Impostor Selection for T-norm score Normalisation and the Background Dataset in SVM-based Speaker Verification," Advances in Biometrics, Jun. 2009, pp. 474-483.

Morrison et al., "An empirical estimate of the precision of likelihood ratios from a forensic-voice-comparison system," Forensic Science International, vol. 208, May 2011, pp. 59-65.

Morrison et al., "Assessing the admissibility of a new generation of forensic voice comparison testimony," Columbia Science and Technology Law Review, vol. 18, Spring 2016, pp. 326-434.

Parthasarathy et al., "Defining Emotionally Salient Regions using Qualitative Agreement Method," Interspeech, San Francisco, CA, USA, Sep. 2016, pp. 3598-3602.

Patil et al., "The physiological microphone (PMIC): A competitive alternative for speaker assessment in stress detection and speaker verification," Speech Communication: Special Issue on Silent Speech Interfaces, vol. 52, No. 4, Apr. 2010, pp. 327-340.

Poh et al., "Estimating the confidence interval of expected performance curve in biometric authentication using joint bootstrap," 2007 IEEE International Conference on Acoustics, Speech and Signal Processing—ICASSP'07, vol. 2, Apr. 2007, 11 pp.

President's Council of Advisors on Science and Technology 2016 Report, "Forensic science in criminal courts: Ensuring scientific validity of feature-comparison methods," Sep. 2016, 174 pp.

Sanchez et al., "Multi-System Fusion of Extended Context Prosodic and Cepstral Features for Paralinguistic Speaker Trait Classification," Thirteenth Annual Conference of the International Speech Communication Association, Sep. 2012, 4 pp.

Shriberg et al., "Effects of Vocal Effort and Speaking Style on Text-Independent Speaker Verification," Ninth Annual Conference of the International Speech Communication Association, Sep. 2008, 4 pp.

Womack et al., "Classification of Speech Under Stress using Target Driven Features," Speech Communications, Special Issue on Speech Under Stress, vol. 20, No. 1-2, Nov. 1996, pp. 131-150.

Womack et al., "N-Channel Hidden Markov Models for Combined Stress Speech Classification and Recognition," IEEE Transactions on Speech & Audio Processing, vol. 7, No. 6, Nov. 1999, pp. 668-677.

Zhang et al., "An Advanced Entropy-based Feature with Frame-Level Vocal Effort Likelihood Space Modeling for Distant Whisper-Island Detection," Speech Communication, vol. 66, Feb. 2015, pp. 107-117.

Zhang et al., "Analysis and Classification of Speech Mode: Whispered through Shouted," Eighth Annual Conference of the International Speech Communication Association, Aug. 2007, 4 pp.

Zhang et al., "Whisper-Island Detection Based on Unsupervised Segmentation with Entropy-Based Speech Feature Processing," IEEE Transactions Audio, Speech and Language Processing, vol. 19, No. 4, May 2011, pp. 883-894.

Zheng et al., "MobileUTDrive: An Android Portable Device Platform for In-vehicle Driving Data Collection and Display," FAST-zero'15: 3rd International Symposium on Future Active Safety Technology Toward zero traffic accidents, Gothenburg, Sweden, Sep. 9-11, 2015, pp. 317-322.

Zhou et al., "Nonlinear Feature Based Classification of Speech under Stress," IEEE Transactions on Speech & Audio Processing, vol. 9, No. 2, Mar. 2001, pp. 201-216.

Bakst et al., "Time-varying score reliability prediction in speaker identification", The Speaker and Language Recognition Workshop (Odyssey 2022), Jun. 28, 2022, 6 pp.

Beck et al., "A Bilingual Multi-Modal Voice Corpus for Language and Speaker Recognition (LASR) Services", The Speaker and Language Recognition Workshop, May 31, 2004, 6 pp.

Campbell et al., "Estimating and evaluating confidence for forensic speaker recognition", Proceedings. (ICASSP '05). IEEE International Conference on Acoustics, Speech, and Signal Processing, 2005, Mar. 23, 2005, p. ?.

Espy-Wilson et al., "A New Set of Features for Text-Independent Speaker Identification", Ninth International Conference on Spoken Language Processing, Sep. 17, 2006, 4 pp.

Fenu et al., "Improving Fairness in Speaker Recognition", Proceedings of the 2020 European Symposium on Software Engineering, Nov. 2020, 8 pp.

Ferrer et al., "A Speaker Verification Backend with Robust Performance across Conditions", Computer Science and Language, vol. 71, Aug. 18, 2021, 53 pp.

Ferrer et al., "Classification of Lexical Stress using Spectral and Prosodic Features for Computer-Assisted Language Learning Systems", Speech Communication, vol. 69, May 2015, 20 pp.

Garcia-Romero et al., "Analysis of I-vector Length Normalization in Speaker Recognition Systems", Twelfth annual conference of the international speech communication association, Aug. 2011, pp. 249-252.

Gillespie et al., "Speech Dereverberation Via Maximum-Kurtosis Subband Adaptive Filtering", 2001 IEEE International Conference on Acoustics, Speech, and Signal Processing. Proceedings (Cat. No. 01CH37221), vol. 6, May 7, 2001, 4 pp.

Hayashida et al., "Close/distant talker discrimination based on kurtosis of linear prediction residual signals", 2014 IEEE International Conference on Acoustics, Speech and Signal Processing (ICASSP), May 4, 2014, 5 pp.

He et al., "Between-speaker variability and temporal organization of the first formant", The Journal of the Acoustical Society of America, vol. 145, No. 3, Mar. 11, 2019, EL209-EL214 pp.

Hicklin et al., "Assessing the clarity of friction ridge impressions", Forensic Science International, vol. 226, No. 1-3, Mar. 10, 2013, 106-117 pp.

Huggins et al., "Confidence Metrics for Speaker Identification", Seventh International Conference on Spoken Language Processing, Sep. 16, 2002, 4 pp.

Lu et al., "The Effect of Language Factors for Robust Speaker Recognition", 2009 IEEE International Conference on Acoustics, Speech and Signal Processing, Apr. 19, 2009, 4217-4220 pp.

McDougall et al., "Discrimination of Speakers Using the Formant Dynamics of /u:/ in British English", Proceedings of the International Congress of Phonetic Sciences, Aug. 6, 2007, 1825-1828 pp.

McLaren et al., "How to Train Your Speaker Embeddings Extractor", The Speaker and Language Recognition Workshop (Odyssey 2018), Jun. 26, 2018, pp. 327-334.

McLaren et al., "Trial-Based Calibration for Speaker Recognition in Unseen Conditions", Proc. Odyssey, Jun. 16, 2014, 19-25 pp.

Park et al., "Using Voice Quality Features to Improve Short-Utterance, Text-Independent Speaker Verification Systems", Interspeech, Aug. 20, 2017, 5 pp.

Parthasarathy et al., "Predicting Speaker Recognition Reliability by Considering Emotional Content", 2017 Seventh International Conference on Affective Computing and Intelligent Interaction (ACII), Oct. 23, 2017, 434-439 pp.

Prince et al., "Probabilistic Linear Discriminant Analysis for Inferences About Identity", 2007 IEEE 11th International Conference on Computer Vision, Oct. 14, 2007, 8 pp.

R Core Team, "The R Project for Statistical Computing", R Foundation for Statistical Computing, Vienna, Austria, Retrieved from: https://www.r-project.org/, Accessed on : Jul. 17, 2023, 3 pp.

Richiardi et al., "Speaker Verification With Confidence and Reliability Measures", 2006 IEEE International Conference on Acoustics Speech and Signal Processing Proceedings., vol. 1, May 14, 2006, 1-4 pp.

(56) References Cited

OTHER PUBLICATIONS

Snyder, "NIST SRE 2016 Xvector Recipe", Retrieved from: https://david-ryan-snyder.github.io/2017/10/04/model_sre16_v2.html, Oct. 4, 2017, 3 pp.

Talkin, "A Robust Algorithm for Pitch Tracking (RAPT)", Speech Coding and Synthesis, Elsevier Science, 1995, pp. 495-502, (Applicant points out, in accordance with MPEP 609.04(a), that the year of publication, 1995, is sufficiently earlier than the effective U.S. filing date, so that the particular month of publication is not an issue.).

Villalba et al., "Analysis of speech quality measures for the task of estimating the reliability of speaker verification decisions", Speech Communication, vol. 78, Apr. 2016, 42-61 pp.

Villalba et al., "Reliability Estimation of the Speaker Verification Decisions Using Bayesian Networks to Combine Information from Multiple Speech Quality Measures", Advances in Speech and Language Technologies for Iberian Languages, Nov. 21, 2012, 10 pp.

U.S. Appl. No. 18/301,064, filed Apr. 14, 2023, naming inventors Bakst et al.

* cited by examiner

MACHINE LEARNING MODEL CAPABILITY ASSESSMENT

This application claims the benefit of U.S. Provisional Patent Application No. 63/126,117, filed Dec. 16, 2020, the entire contents of which is incorporated herein by reference.

GOVERNMENT RIGHTS

This invention was made with Government support under contract no. N4175618C3006 awarded by the Navy Engineering Logistics Office. The Government has certain rights in this invention.

TECHNICAL FIELD

This disclosure is related to machine learning systems, and more specifically to executing a machine learning model to verify a dataset.

BACKGROUND

A system may execute a machine learning model to determine a probability that a dataset includes a characteristic. The system may train the machine learning model using training data including a plurality of training datasets. For example, to train a supervised learning (SL) model, the system may analyze the plurality of training datasets to generate an inferred function. The system may execute the inferred function in order to evaluate the probability that a new dataset includes the characteristic. In some cases, the machine learning model might not accurately determine the probability that the dataset includes the characteristic when the training data is insufficient. In some examples, the training data may be insufficient when the training data does not include at least a threshold number of training datasets.

SUMMARY

In general, the disclosure describes one or more techniques for assessing a machine learning model's capabilities under varying operating conditions. A system may execute a machine learning model to analyze a dataset including two or more samples. The machine learning model may output a probability that the two or more samples correspond to the same object. Additionally, or alternatively, the machine learning model may output a probability that the two or more samples correspond to at least two different objects. In some examples, the dataset may represent a media dataset including at least one of audio data and image data. When the dataset includes audio data, the system may execute the machine learning model to determine a probability that two or more audio samples in the dataset correspond to the same human speaker (e.g., the object). When the dataset includes video data, the system may execute the machine learning model to determine a probability that human faces in two or more video samples correspond to the same human individual. This disclosure is not meant to be limited to machine learning models for voice recognition and facial recognition. The techniques described herein may determine the capabilities of any machine learning model to analyze datasets of any kind.

When the system executes a machine learning model to determine a probability that two or more samples correspond the same object, it is possible that the two or more samples may have been obtained under different operating conditions even when the two or more samples correspond to the same object. For example, when the dataset includes two or more audio samples, one of the audio samples may be recorded in a quiet environment and another audio sample may be recorded in an environment having music in the background. The machine learning model may include a plurality of reference datasets. Differences in operating conditions under which a sample is obtained may impact a performance of the machine learning model in processing the dataset; it may therefore be beneficial to select, from the plurality of reference datasets, one or more reference datasets having similar conditions to the dataset being evaluated by the machine learning model (e.g., the trial dataset). The system may determine a probability that the two or more samples of the dataset correspond the same object based on the one or more selected reference datasets that include conditions similar to the conditions of the trial dataset.

The system may select the one or more reference datasets from the plurality of reference datasets. For example, the system may execute a transformation in order to compare conditions of the dataset with the conditions of each reference dataset of the plurality of reference datasets. The system may analyze the plurality of reference datasets to determine whether each reference dataset of the plurality of reference datasets includes conditions that are sufficiently similar to the conditions of either of the samples in the dataset. In some examples, system may output an indication that the plurality of reference datasets do not include enough reference datasets having conditions similar to the conditions of the trial dataset, and the machine learning model thus might not correctly verify that two or more samples in the trial dataset are associated with the same object. When the system determines that the plurality of reference datasets are insufficient for correctly verifying that the trial dataset includes samples from the same object, the system may output a suggestion to add more reference datasets to the plurality of reference datasets. In this way, the system assesses the machine learning model's capabilities under varying operating conditions.

The techniques may provide one or more advantages that realize at least one practical application. For example, assessing capabilities of a machine learning model under varying operating conditions may provide an operator with a confidence level, an indication of a quality of object detection performed by the machine learning model, a scope of operating conditions under which the machine learning model may capably perform object detection, or feedback about specific condition affecting detection. As another example, the system may adjust, based on the capability assessment, a system parameter to modify application of the machine learning model to the media dataset for verifying the object in the media dataset. As another example, the techniques may allow the system to better improve a pool of reference data, as compared with systems that do not evaluate the capabilities of reference data and output suggestions to add more reference data when necessary.

In some examples, a computing system includes a storage device; and processing circuitry having access to the storage device and configured to: receive information indicative of a media dataset comprising at least one of audio data and image data, wherein the media dataset corresponds to an object; and analyze the media dataset to compute a corresponding set of operating condition weight values, wherein each operating condition weight value of the set of operating condition weight values corresponds to a different operating condition of a set of operating conditions. Additionally, the processing circuitry is configured to compare the set of operating condition weight values corresponding to the media dataset with a plurality of sets of reference operating condition weight values that each correspond to a different reference media dataset of a plurality of reference media datasets; determine, based on the comparison of the set of operating condition weight values with the plurality of sets of reference operating condition weight values, an indication of a capability of a trained machine learning model to correctly verify the object in the media dataset; and perform an action based on the indication.

In some examples, a method includes receiving, by processing circuitry having access to a storage device, information indicative of a media dataset comprising at least one of audio data and image data, wherein the media dataset corresponds to an object; and analyzing, by the processing circuitry, the media dataset to compute a corresponding set of operating condition weight values, wherein each operating condition weight value of the set of operating condition weight values corresponds to a different operating condition of a set of operating conditions. Additionally, the method includes comparing, by the processing circuitry, the set of operating condition weight values corresponding to the media dataset with a plurality of sets of reference operating condition weight values that each correspond to a different reference media dataset of a plurality of reference media datasets; determining, by the processing circuitry based on the comparison of the set of operating condition weight values with the plurality of sets of reference operating condition weight values, an indication of a capability of a trained machine learning model to correctly verify the object in the media dataset; and performing, by the processing circuitry, an action based on the indication.

In some examples, a computer-readable medium comprising instructions that, when executed by a processor, causes the processor to: receive information indicative of a media dataset comprising at least one of audio data and image data, wherein the media dataset corresponds to an object; and analyze the media dataset to compute a corresponding set of operating condition weight values, wherein each operating condition weight value of the set of operating condition weight values corresponds to a different operating condition of a set of operating conditions. Additionally, the instructions cause the processor to compare the set of operating condition weight values corresponding to the media dataset with a plurality of sets of reference operating condition weight values that each correspond to a different reference media dataset of a plurality of reference media datasets; determine, based on the comparison of the set of operating condition weight values with the plurality of sets of reference operating condition weight values, an indication of a capability of a trained machine learning model to correctly verify the object in the media dataset; and perform an action based on the indication.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

This disclosure describes techniques for determining whether a model is capable of correctly assessing media data. For example, a machine learning system may be trained to perform under a set of conditions. The system may (1) detect one or more operating conditions in a media dataset, (2) use the detected conditions to adjust one or more parameters of the system, (3) use the detected conditions to assess a performance of the system in assessing the media dataset, and (4) use the detected conditions to determine if the system is competent to assess the media dataset. As such, the system may be able to operate according to a wide range of operating environments without being restricted to a narrow set of operating environments. The system may be configured to assess a performance and competence of the system. The system may report decisions and report a likelihood of successfully completing a task.

The system may detect, in a media dataset, salient environmental conditions that impact how the given system functions, and adjust the system's functioning based on this input. When the media dataset represents an audio dataset, the environmental conditions may include microphone conditions, transmission channel conditions, background noise conditions, amount and quality of speech conditions, bit rate conditions, and codec speaker characteristic conditions. When the media dataset represents a video dataset, the environmental conditions may include clarity conditions, lighting conditions, pose conditions, bit rate conditions, codec conditions, and resolution conditions. The system may estimate operating conditions based on a deep-learning representation for a task (e.g., speaker recognition, facial recognition, and object detection). The system may additionally or alternatively use a specialized representation developed for capturing these operating conditions. Once an environment is characterized based on the operating conditions, the system may use the representation is to automatically assemble a set of condition-relevant data from an existing pool of data to represent the task. When the system assembles a sufficient amount of data, the system may use the data to estimate system parameters (e.g., calibration values, threshold values). The system may apply these system parameters to improve a performance of the system under the operating conditions, and assess the system's likely performance in terms of error rate and confidence interval. If the system cannot assemble a sufficient amount of data, then the system may output a message that the system is not competent to perform the task. In some examples, the system self-assesses at run-time for each test example. In some examples, the system may train a machine learning model to predict relevant values.

The system may detect operating conditions using a representation that captures the impact the conditions will have on the task performance itself. The system may generate parameters without human input. Additionally, or alternatively, the system may report back to the user about what conditions are impacting the system and what effect the conditions have on accuracy.

Figure 1:
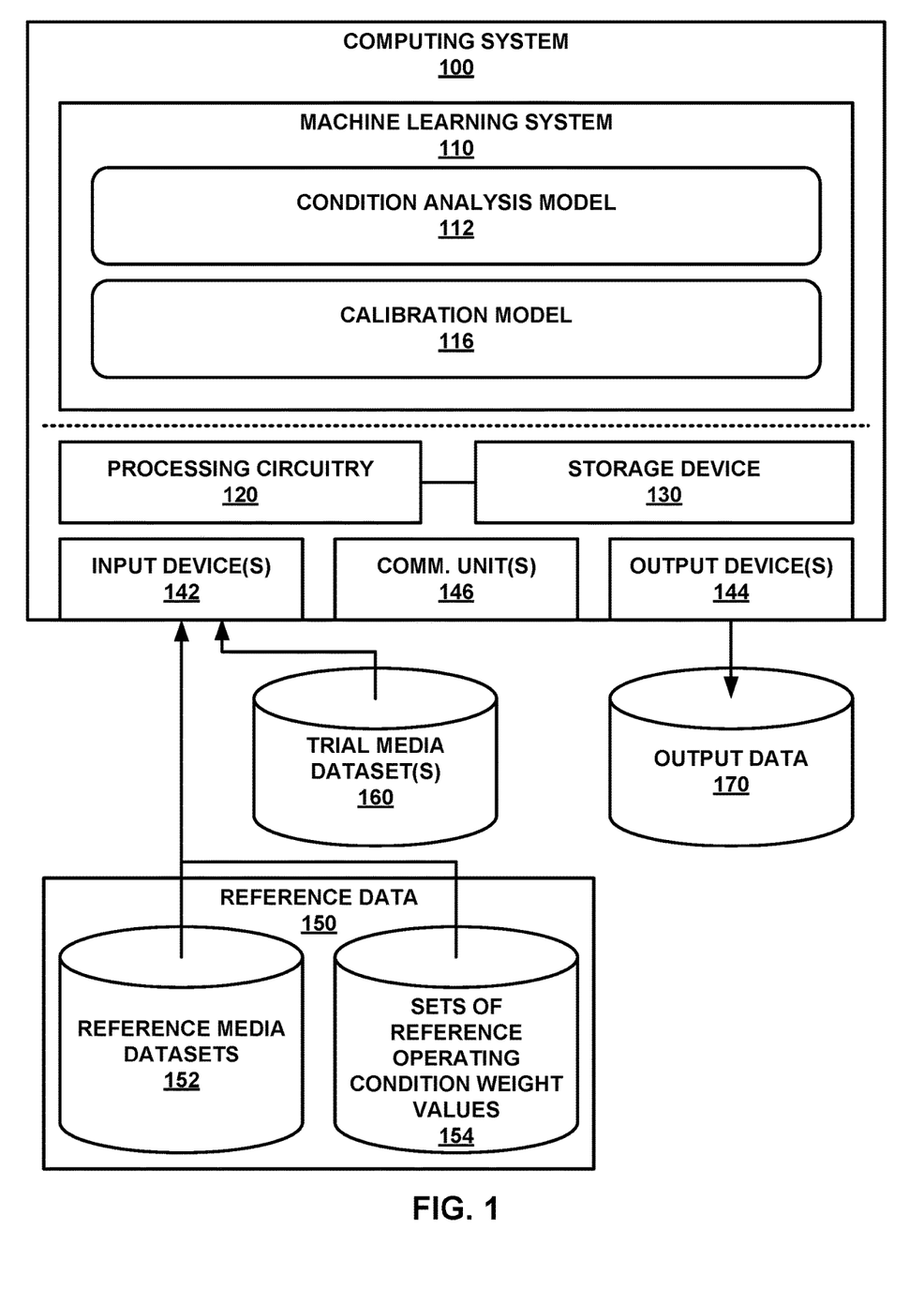
FIG. 1 is a block diagram illustrating an example computing system that implements a machine learning system to determine a capability of the machine learning system to process one or more data samples, in accordance with one or more techniques of this disclosure.

FIG. 1 is a block diagram illustrating an example computing system 100 that implements a machine learning system 110 to determine a capability of the machine learning system 110 to process one or more data samples, in accordance with one or more techniques of this disclosure. Computing system 100 includes machine learning system 110, processing circuitry 120, storage device 130, input devices 142, output devices 144, and communication units 146. Machine learning system 110 may include condition analysis model 112, and calibration model 116. Processing circuitry 120 may execute machine learning system 110.

In some examples, computing system 100 may be configured to receive input data via input devices 142. Input data may include reference data 150. Reference data 150 includes reference media datasets 152 and reference operating condition weight values 154. Input data may additionally or alternatively include trial media datasets 160. Additionally, or alternatively, computing system 100 may be configured to generate output data 170, and send the output data via output devices 144.

In general, processing circuitry 120 may be configured to execute machine learning system 110 in order to verify one or more trial media dataset of trial media datasets 160. For example, a trial media dataset may include a set of media samples. One or more first media samples of the set of media samples are known to be associated with an object, and one or more second media samples of the set of media samples are associated with the object or another object. In other words, the one or more second media samples are possibly associated with the object of the one or more first samples, but the association of the second media samples is unknown. To verify a trial media dataset of trial media datasets 160, computing system 100 may determine, based on reference data 150, whether the one or more second media samples are associated with the object. When computing system 100 determines that both of the first media samples and the second media samples are associated with the object, then computing system 100 verifies the trial media dataset. When computing system 100 determines that the second media sample(s) are not associated with the object of the first media samples, then computing system 100 does not verify the trial media dataset.

Reference media datasets 152 and trial media datasets 160 may include any kind of media data, such as audio data and/or image data. The techniques of this disclosure are not meant to be limited to audio data and image data, and the techniques of this disclosure are not meant to be limited to media data. Computing system 100 may be configured to verify trial data of any type using reference data of any corresponding type.

When processing circuitry 120 may be configured to execute machine learning system 110 in order to determine whether two samples from a trial media dataset are associated with the same object or associated with different objects, the two samples may come from different conditions or environments. For example, when the trial media dataset represents audio data, one audio sample may be from a quiet environment and the other audio sample may come from an environment having music in the background. Additionally, or alternatively, when the trial media dataset represents image data, one image sample may be from a bright environment and the other image sample may come from a dark environment. In any case, each sample of the trial media dataset may be associated with one or more environmental conditions, and these environmental conditions may affect a manner in which machine learning system 110 analyzes the trial media dataset.

In some examples, processing circuitry 120 may be configured to execute condition analysis model 112 in order to identify a set of operating condition weight values corresponding to a trial media dataset of trial media datasets 160. Condition analysis model 112 may represent a trained machine learning model that accepts a media dataset as an input and generates a set of operating condition weight values as an output. In some examples, machine learning system 110 trains condition analysis model 112 based on reference media datasets 152 and reference operating condition weight values 154. Each reference media dataset of reference media datasets 152 may correspond to a respective set of reference operating condition weight values of reference operating condition weight values 154. Consequently, machine learning system 110 may train condition analysis model 112 based on known associations between reference media datasets 152 and reference operating condition weight values 154.

When condition analysis model 112 outputs a set of operating condition weight values corresponding to the trial media dataset, processing circuitry 120 may execute condition analysis model 112 in order to compare the set of operating condition weight values with each set of reference operating condition weight values of the plurality of sets of reference operating condition weight values 154. For example, condition analysis model 112 may compute a plurality of similarity values, wherein each similarity value of the plurality of similarity values corresponds to the set of operating condition weight values for the trial media dataset and a respective set of reference operating condition weight values of the plurality of sets of reference operating condition weight values 154. That is, a similarity value represents a similarity between the set of operating condition weight values for the trial media dataset and one of the sets of reference operating condition weight values 154 corresponding to a respective reference media dataset of the reference media datasets 152.

In some examples, condition analysis model 112 comprises a model (e.g., a probabilistic linear discriminant analysis (PLDA) model) that computing system 100 trains to identify a set of operating condition weight values of a trial media dataset. Condition analysis model 112 may determine whether identified set of operating condition weight values of the trial media dataset are the same or different from the sets of reference operating condition weight values 154 of the reference media datasets 152. In some examples, condition analysis model 112 may apply a threshold to each similarity value of the set of similarity values in order to determine whether the set of operating condition weight values for the trial media dataset is sufficiently similar to the respective set of reference operating condition weight values. In some examples, condition analysis model 112 may generate a score for each of reference media datasets 152 and the trial media dataset compared against a set of models for each possible discrete condition to assign condition labels to all the data.

Condition analysis model 112 may identify, based on the plurality of similarity values, a subset of the reference media datasets 152 that computing system 100 can use for calibration of the trial media dataset. For example, condition analysis model 112 may compare each similarity value of the plurality of similarity values to a threshold similarity value. Condition analysis model 112 may select each reference media dataset corresponding to a similarity value greater than the similarity value threshold to generate the subset of reference media datasets for calibration. That is, condition analysis model 112 may select each reference media dataset associated with a set of reference operating condition weight values that are sufficiently similar to the set of operating condition weight values for the trial media dataset.

To determine a capability of machine learning system 110 to correctly verify the trial media dataset based on the subset of reference media datasets 152, processing circuitry 120 may execute condition analysis model 112 in order to determine whether a number of reference media datasets in the subset of reference media datasets is greater than a threshold number of reference media datasets. In other words, condition analysis model 112 may determine whether there is a large enough number of reference media datasets in reference media datasets 152 having operating conditions that are sufficiently similar to the operating conditions of the trial media dataset. When the number of reference media datasets in the subset of reference media datasets is greater than the threshold number of reference media datasets, condition analysis model 112 may output a recommendation to calibrate the trial media dataset using the subset of reference media datasets. When the number of reference media datasets in the subset of reference media datasets is not greater than the threshold number of reference media datasets, condition analysis model 112 may output an indication that the reference media datasets 152 are insufficient for calibrating the trial media dataset.

In some examples, when condition analysis model 112 determines that the reference media datasets 152 are insufficient for calibrating the trial media dataset, condition analysis model 112 may output information indicative of a suggestion to add reference media datasets to the reference media datasets 152. When condition analysis model 112 does not identify enough reference media datasets having conditions similar to the conditions of the trial media dataset, it may be possible to supplement reference media datasets 152 with one or more additional reference media datasets associated with operating conditions similar to the operating conditions of the trial media dataset. Condition analysis model 112 may determine, based on the set of operating condition weight values corresponding to the trial media data set, one or more operating conditions that are present in the trial media data set. Condition analysis model 112 may output information indicative of a suggestion to supplement the reference media datasets 152 with one or more additional reference media datasets comprising the one or more operating conditions that are present in the trial media dataset and are not sufficiently present in the reference media datasets 152.

Condition analysis model 112 may, in some examples, receive a confirmation that one or more additional reference media datasets are added to the reference media datasets 152. Based on receiving the confirmation, condition analysis model 112 may compare the set of operating condition weight values corresponding to the trial media dataset with the sets of reference operating condition weight values 154 corresponding to the reference media datasets 152 including the one or more additional reference media datasets. Condition analysis model 112 may determine whether a large enough subset of reference media datasets 152 having operating conditions similar to the operating conditions of the trial media dataset exists following the addition of more reference media datasets. Condition analysis model 112 may determine, based on the comparison of the set of operating condition weight values corresponding to the trial media dataset with the sets of reference operating condition weight values 154, a capability of the trained machine learning model to correctly verify the trial media dataset based on the reference data 150. In some examples, machine learning model 110 may perform an action based on determining the capability of the trained machine learning model. For example, machine learning model 110 may output one or more instructions to add to the trial media dataset. In some examples, machine learning model 110 may decline to take further action in response to determining the capability of the trained machine learning model.

In some examples, based on determining that machine learning system 110 is capable of correctly verifying the trial media dataset using a subset of the reference media datasets 152, the processing circuitry 120 is configured to execute calibration model 116 in order to calibrate the trial media dataset with the subset of the reference media datasets 152 identified using condition analysis model 112. In some examples, the calibration model 116 represents a trained machine learning model configured to compute a probability that a trial media dataset includes samples from the same object or includes samples from different objects. For example, a trial media dataset of trial media datasets 160 may include a first one or more media samples and a second one or more media samples. In some examples, the first one or more media samples are known to be associated with an object, and an object association of the second one or more media samples is unknown. Processing circuitry 120 may execute calibration model 116 in order to compute a probability that the second one or more media samples is associated with the object, based on the subset of the reference media datasets 152 identified by condition analysis model 112. Calibration model 116 may output, to output data 170, information indicative of the probability that the second one or more media samples are associated with the object.

Computing system 100 may develop and train machine learning system 110 in order to perform optimally under a broad set of conditions. By developing condition analysis model 112 to identify a set of reference operating condition weight values for a trial media dataset, computing system 100 may improve a capability of calibration model 116 to verify that media samples of the trial media dataset are associated with the same object as compared with systems that do not develop models for identifying a set of reference operating condition weight values for a trial media dataset. While some models might only perform under a narrow set of conditions and output scores and confidence values that valid only under this narrow set of conditions, computing system 100 may train machine learning system 110 to process a trial media dataset to identify a broad set of reference operating condition weight values.

Condition analysis model 112 may execute a trial-based calibration (TBC) approach. For example, condition analysis model 112 is configured to process a trial media dataset in order to detect a set of operating condition weight values and use the set of operating condition weight values to customize the analysis of machine learning system 110 to fit the operating conditions of the trial media dataset. For example, condition analysis model 112 may select a subset of reference media datasets 152 based on the identified set operating condition weight values for the trial media dataset.

The subset of reference media datasets 152 may include one or more operating conditions similar to the operating conditions of the trial media dataset being analyzed by machine learning system 110. By selecting the subset of reference media datasets 152 to match the operating conditions of the trial media dataset, condition analysis model 112 may customize the calibration model 116 to evaluate trail media datasets from many different operating environments. Further description of trial-based calibration is found in US Publication No. 2019/0013013, published Jan. 10, 2019, which is incorporated by reference herein in its entirety. Operating conditions may include behavioral conditions, environmental conditions, use-case conditions, media data capture, storage, and transmission conditions, and other conditions.

Condition analysis model 112 may analyze the set of operating condition weight values for the trial media dataset to assess a capability of the calibration model 116 to verify that the trial media dataset includes samples from the same object based on the reference data 150. For example, condition analysis model 112 may compare the set of operating condition weight values of the trial media dataset with each of a plurality of sets of reference operating condition weight values. By assessing the capability of the calibration model 116 to verify the trial media dataset, condition analysis model 112 may allow computing system 100 to perform within wide range of operating environments and not be bound to a restricted set of environments, and machine learning system 110 may assess its performance.

In some examples, an accuracy of calibration model 116 in correctly determining whether a trial media dataset includes media samples from the same object depends on an accuracy by which condition analysis model 112 matches the set of operating condition values for the trial media dataset to the sets of reference operating condition weight values 154. Using condition analysis model 112 to automatically match operating conditions in order to select the subset of reference medial datasets 152 may improve a performance of calibration model 116 in verifying the trial media dataset as compared with systems that rely on human selection of reference datasets.

Each reference media dataset of reference media datasets 152 may include two or more reference media samples. In some examples, reference media datasets 152 may include a first one or more reference media datasets 152 that each include a set of reference media samples known to be associated with the same object. In some examples, reference media datasets 152 may include a second one or more reference media datasets 152 that each include a first one or more reference media samples known to be associated with an object, and a second one or more reference media samples known to be from an object different from the object of the first one or more reference media samples. In this way, when calibration model 116 evaluates a trial media dataset having a pair of media samples, calibration model 116 can determine a probability that the pair of media samples are associated with the same object based on samples known to be from the same object and samples known to be from different objects. For example, the subset of reference media datasets 152 selected by condition analysis model 112 to evaluate the trial media dataset may include one or more reference media datasets that each include a respective pair of media samples known to be associated with the same object, and one or more reference media datasets that each include a respective pair of media samples known to be associated with different objects.

In some examples, machine learning system 110 may calculate one or more accuracy metrics (e.g., an equal error rate, a cost function) that represent a probability that the trial media dataset includes a pair of media samples associated with the same object. Machine learning system 110 may execute a bootstrap estimation approach using the subset of reference media datasets 152 in order to determine a confidence interval corresponding to the probability that the trial media dataset includes a pair of media samples associated with the same object. Machine learning system 110 may determine the confidence interval based on the subset of reference media datasets selected to have similar conditions to the conditions of the trial media dataset. In some examples, condition analysis model 112 may select the subset of reference media datasets 152 using TBC (e.g., processing each reference media dataset of reference media datasets 152 in order to generate the sets of reference operating condition weight values 154). In some examples, condition analysis model 112 may select the subset of reference media datasets based on one or more operating condition labels attached to the reference media datasets 152.

In some examples, condition analysis model 112 may select a subset of reference media datasets 152 corresponding to each trial media dataset of trial media datasets 160. That is, condition analysis model 112 may select reference media datasets having similar operating conditions to the operating conditions of the respective trial media dataset. Machine learning model 110 may train transformation parameters using the selected subsets of reference media datasets. For examples, machine learning model 110 may bootstrap sampling the subsets to obtain one or more sets of transformation model parameters. Machine learning model 110 may apply the transformation model parameters to the output comparison scores from the calibration model 116. The set of transformed comparison scores may reflect a reliability of the transformation parameters. When the bootstrap-sampled subsets of reference media datasets on which transformation parameters are trained are very homogeneous, the transformation parameters produced by condition analysis model 112 may have a low variance, and therefore result in low variation in the transformed comparison scores output by calibration model 116.

Computing system 100 may apply one or more techniques described herein in order to perform forensic speech analysis. For example, forensics data may indicate speaker intrinsic variability including, for example, variability in speaking style, emotional state (e.g., mismatches including high emotional stress), physical stress, and language spoken (e.g., cross-language mismatch). Computing system 100 may facilitate forensic speaker recognition (SR) by automating the detection of speaker-intrinsic conditions using condition analysis model 112 and determining an expected performance of calibration model 116 in performing forensic speaker recognition of a trial voice dataset.

Trial media datasets 160 may include, in some examples, one or more trial audio datasets. Each trial audio dataset of the one or more trial audio datasets may include two or more audio samples where one audio sample is known to be associated with a human speaker, and a speaker of the other audio sample is unknown. Consequently, the "object" of an audio dataset may represent a human speaker, and calibration model 116 may process the trial audio dataset in order to determine whether both audio samples in the trial audio dataset are associated with the same human speaker. When the trial media dataset comprises a trial audio dataset, the trial audio dataset "corresponds to" a human speaker when the trial audio dataset includes a voice spoken by the human speaker. A media dataset corresponds to an object when the media dataset includes data that is introduced into the media dataset by the object.

A range of operating conditions can be present in audio data. These conditions may include language and accent spoken, different speaking styles due to different tasks and social and environmental situations, and due to the effects of physical and emotional stress (e.g., the speaker intrinsic conditions can he embedded within forensically realistic speaker extrinsic conditions such as due to recording channels, noise, reverberation, etc.).

A range of operating conditions can be present in video data. These conditions may include clarity conditions, lighting conditions, pose conditions, bit rate conditions, codec conditions, and resolution conditions.

Condition analysis model 112 may determine whether reference audio datasets of reference media datasets 152 are sufficient to properly calibrate a trial audio dataset of trial media datasets 160. Condition analysis model 112 may identify one or more operating conditions of the trial audio dataset for the conditions relevant to speaker recognition. Furthermore, condition analysis model 112 may use the identified operating conditions to automatically identify a subset of reference audio datasets from the reference media datasets 152. When there is not a large enough number of reference audio datasets having similar operating conditions to the conditions of the trial audio dataset, condition analysis model 112 may output an indication that the reference media datasets 152 are insufficient for analyzing the trial audio dataset. Condition analysis model 112 may also output, to output data 170, one or more reasons why the reference media datasets 152 are insufficient and one or more suggestions for supplementing the reference media datasets 152. In one example, condition analysis model 112 may determine that an audio sample of a trial audio dataset is associated with a human female speaking Mandarin Chinese in a neutral speaking style on a cellular phone. Condition analysis model 112 may use this information to search the reference media datasets 152 for audio samples that match these characteristics. When condition analysis model 112 identifies a subset of reference audio datasets, then calibration model 116 may process the trial audio dataset using the subset of reference audio datasets. When condition analysis model 112 does not identify a large enough number of reference audio datasets from human females speaking Mandarin Chinese in a neutral speaking style on a cellular phone, condition analysis model 112 may output a suggestion to add more reference audio datasets having these characteristic.

When computing system 100 performs voice recognition on a trial audio dataset, machine learning system 110 may select a subset of one or more reference audio datasets of the plurality of reference media datasets 152. Reference media datasets 152 may represent a reference pool including a very large set of reference data comprising many of the operating conditions encountered in voice recognition. These operating conditions may include extrinsic conditions such as channel conditions (e.g., a cellular channel, a push-to-talk radio channel, a landline phone channel, a close microphone channel, and a distant microphone channel), background noise, reverberation characteristics, or any combination thereof. The operating conditions may also include intrinsic conditions such as language, emotion, speaking style, or any combination thereof. A trial media dataset may include two or more audio samples. At least one of these audio samples is known to be from a specific human speaker (e.g., the "object"), and a source of at least one other audio is unknown. The sample of know origin may be referred to as "the trace," and the sample of unknown origin may be referred to as "the probe."

The calibration model 116 may determine a measure of similarity between the voice in trace sample and the voice in the probe sample. The measure of similarity may represent a calibrated likelihood ratio indicating a likelihood that the trace sample and the probe sample are from the same human speaker. Condition analysis model 112 may identify intrinsic and extrinsic conditions of the trace sample and the probe sample, and select a subset of reference audio datasets from the reference media datasets 152. Condition analysis model 112 may determine whether the subset of reference audio datasets is sufficient for calibration of the trial audio dataset or insufficient for calibration of the trial audio dataset. If the subset of reference audio datasets is sufficient for calibration, calibration model 116 may compare the subset of reference audio datasets with the trial audio dataset to generate one or more calibration scores. Calibration model 116 may execute logistic regression software based on these calibration scores in order to train transformation parameters to calibrate a similarity score for the trial audio dataset into a calibrated likelihood ratio (LLR) for the trial in question. Machine learning system 110 may use the calibration scores in the bootstrap performance estimation software. In addition to the calibrated LLR for the trial, calibration model 116 may output the confidence interval corresponding to the calibrated LLR to output data 170. Machine learning system 110 can additionally use calibration scores to plot a distribution of calibration scores for samples from the same speaker and calibration scores for samples from different speakers. Machine learning system 110 may also overlay the calibrated LLR of the trial over the upper and lower confidence bounds for the LLR for graphical reporting.

Computing system 100 may adapt system parameters (e.g., calibration and thresholds) and estimate confidence (e.g., error rates and confidence intervals) by autonomously detecting operating conditions in trial media datasets 160 (audio conditions, video/image quality, clarity, pose, etc.). Computing system 100 may be capable of determining whether operating conditions of a trial media dataset lie outside of a competence of the system, whether values cannot be obtained because the computing system 100 does not have access to operating conditions because the conditions are novel, or whether the samples are too noisy.

Figure 2:
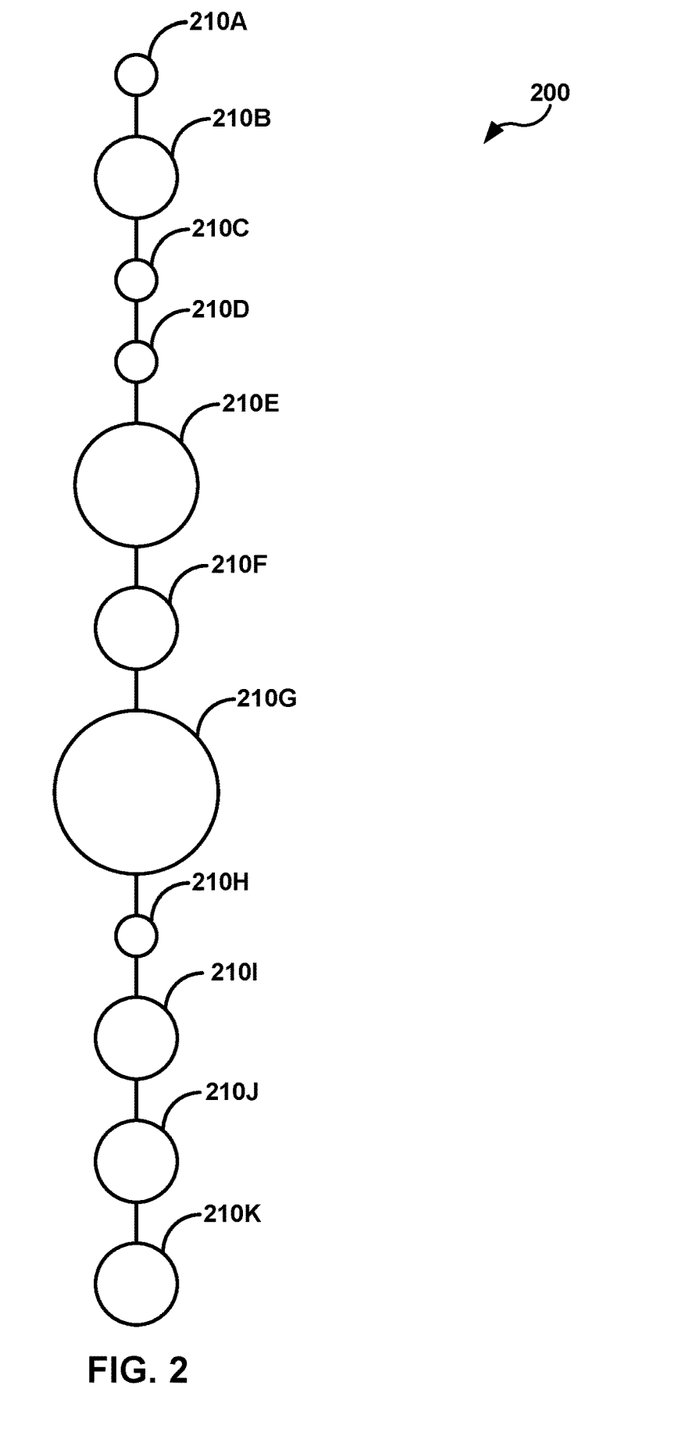
FIG. 2 is a conceptual diagram illustrating a set of operating condition weight values 200, in accordance with one or more techniques described herein.

FIG. 2 is a conceptual diagram illustrating a set of operating condition weight values 200, in accordance with one or more techniques described herein. As seen in FIG. 2, the set of operating condition weight values 200 includes weight values 210A-210K (collectively, "weight values 210"). The set of operating condition weight values 200 may correspond to a trial media dataset of trial media datasets 160. That is, processing circuitry 120 may execute condition analysis model 112 in order to generate the set of operating condition weight values 200. Each weight value is represented as a circle having a size, so a size of each respective weight value is comparable to a size of each other weight value of weight values 210. In some examples, each weight value of weight values 210 may be associated with a numerical value within a range from a first value to a second value.

Each weight value of the set of weight values 210 may be associated with a respective operating condition. Operation conditions may include any one or both of extrinsic operating conditions and intrinsic operating conditions. A higher weight value may indicate a greater probability that the respective operating condition is present in the trial media dataset. For example, when weight value 210G corresponds to the operating condition of "emotional or cognitive stress," and weight value 210H corresponds to the operating condition of "high vocal speaking effort," there a probability that the trial media dataset is associated with emotional or cognitive stress may be greater than a probability that the trial media dataset is associated with high vocal speaking effort, since weight value 210G is greater than weight value 210H.

Figure 3A:
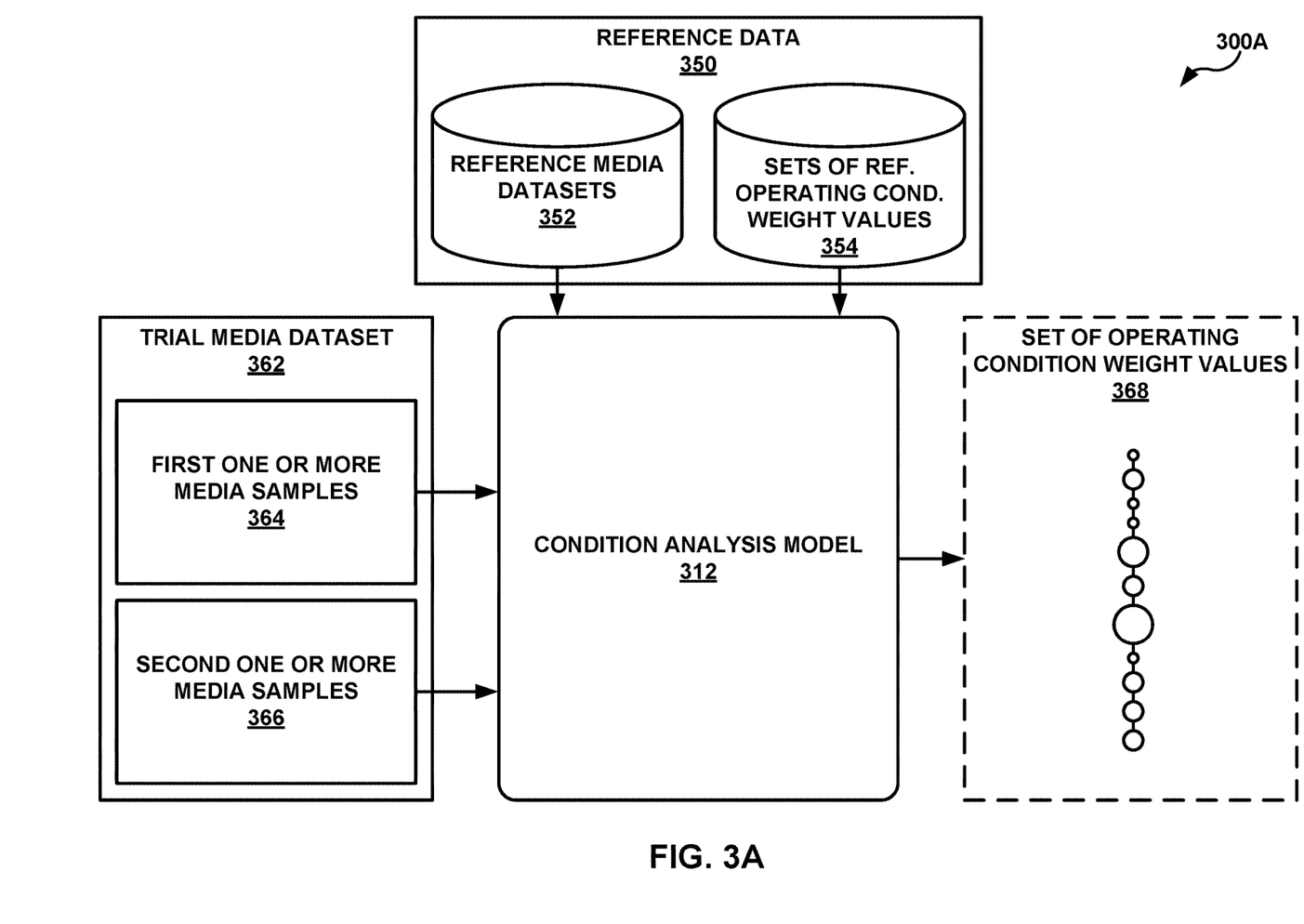
FIG. 3A is a block diagram illustrating a system for generating one or more sets of operating condition weight values based on a trial media dataset and reference data, in accordance with one or more techniques described herein.

FIG. 3A is a block diagram illustrating a system 300A for generating one or more sets of operating condition weight values based on a trial media dataset and reference data, in accordance with one or more techniques described herein. As seen in FIG. 3A, system 300A comprises condition analysis model 312, reference data 350 including a plurality of reference media datasets 352 and a plurality of sets of reference operating condition weight values 354, a trial media dataset 362 including a first one or more media samples 364 and a second one or more media samples 366, and a set of operating condition weight values 368. Condition analysis model 312 may be an example of condition analysis model 112 of FIG. 1. Reference data 350 may be an example of reference data 150 of FIG. 1. Reference media datasets 352 may be an example of reference media datasets 152 of FIG. 1. Sets of reference operating condition weight values 354 may be an example of Sets of reference operating condition weight values 154 of FIG. 1. Trial media dataset 362 may represent one of the trial media datasets 160 of FIG. 1.

Condition analysis model 312 may receive the trial media dataset 362. Trial media dataset 362 may include a first one or more media samples 364 and a second one or more media samples 366. In some examples, the first one or more media samples 364 is known to be associated with an object, and an object association of second one or more media samples 366 is unknown. In other words, the second one or more media samples 366 might be associated with the object that is known to be associated with the first one or more media samples 364, and the second one or more media samples 366 might be associated with an object that is different from the object known to be associated with the first one or more media samples 364. One or more techniques described herein may determine the object association of the second one or more media samples 366.

Condition analysis model 312 may generate the set of operating condition weight values 368. Condition analysis model 312 may process the first one or more media samples 364 and the second one or more media samples 366 in order to generate the set of operating condition weight values 368. In some examples, the condition analysis model 312 may determine the set of operating condition weight values 368 based on the reference data 350, but this is not required. For example, each reference media dataset of reference media datasets 352 may be associated with a respective set of reference operating condition weight values of the plurality of sets of reference operating condition weight values 354. System 300A may train condition analysis model 312 based on the reference media datasets 352 and the corresponding sets of reference operating condition weight values 354 so that condition analysis model 312 may generate the set of operating condition weight values based on known associations between media datasets and operating condition weight values.

Figure 3B:
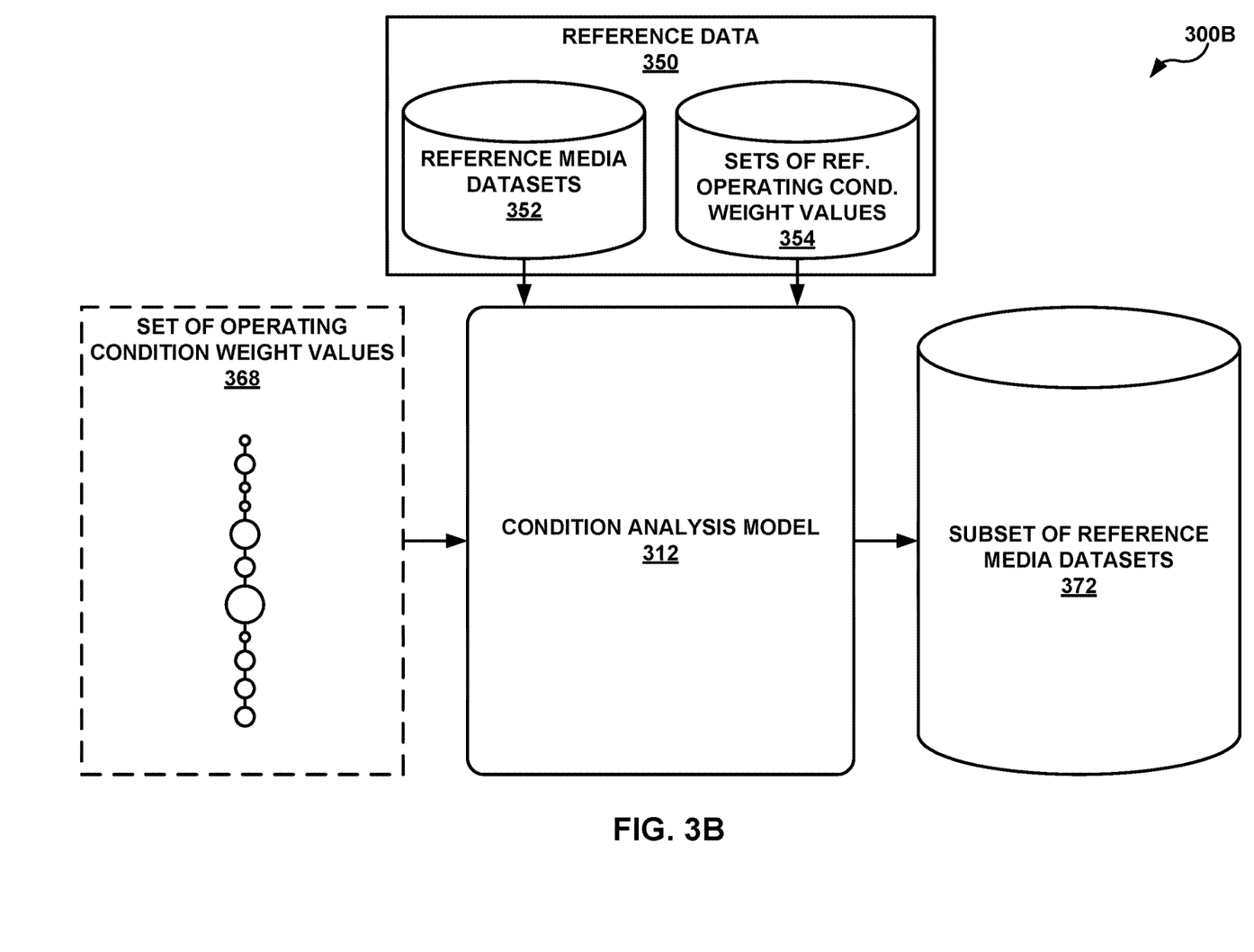
FIG. 3B is a block diagram illustrating a system for selecting one or more subsets of reference media datasets from a plurality of reference media datasets, in accordance with one or more techniques described herein.

FIG. 3B is a block diagram illustrating a system 300B for selecting one or more subsets of reference media datasets from a plurality of reference media datasets, in accordance with one or more techniques described herein. As seen in FIG. 3B, system 300B comprises condition analysis model 312, reference data 350 including a plurality of reference media datasets 352 and a plurality of sets of reference operating condition weight values 354, a set of operating condition weight values 368 and a subset of reference media datasets 372. Condition analysis model 312 may be an example of condition analysis model 112 of FIG. 1. Reference data 350 may be an example of reference data 150 of FIG. 1. Reference media datasets 352 may be an example of reference media datasets 152 of FIG. 1. Sets of reference operating condition weight values 354 may be an example of Sets of reference operating condition weight values 154 of FIG. 1.

Condition analysis model 312 may, in some examples, select the subset of reference media datasets 372 based on the set of operating condition weight values 368 generated by the condition analysis model 312. Condition analysis model 312 may select the subset of reference media datasets 372 from the reference media datasets 352. For example, condition analysis model 312 may select the subset of reference media datasets 372 to include one or more reference media datasets each associated with a set of reference operating condition weight values similar to the set of operating condition weight values 368. Condition analysis model 312 may execute one or more stages of filtering in order to select the subset of reference media datasets 372 from the plurality of reference media datasets 352. For example, condition analysis model 312 may execute a first filtering stage in order to exclude one or more reference media datasets that are mismatched from the set of operating condition weight values 368. Condition analysis model 312 may execute a second filtering stage in order to further refine the reference media datasets 352 to select the subset of reference media datasets 372. In some examples, the second filtering stage represents a TBC algorithm.

Figure 4:
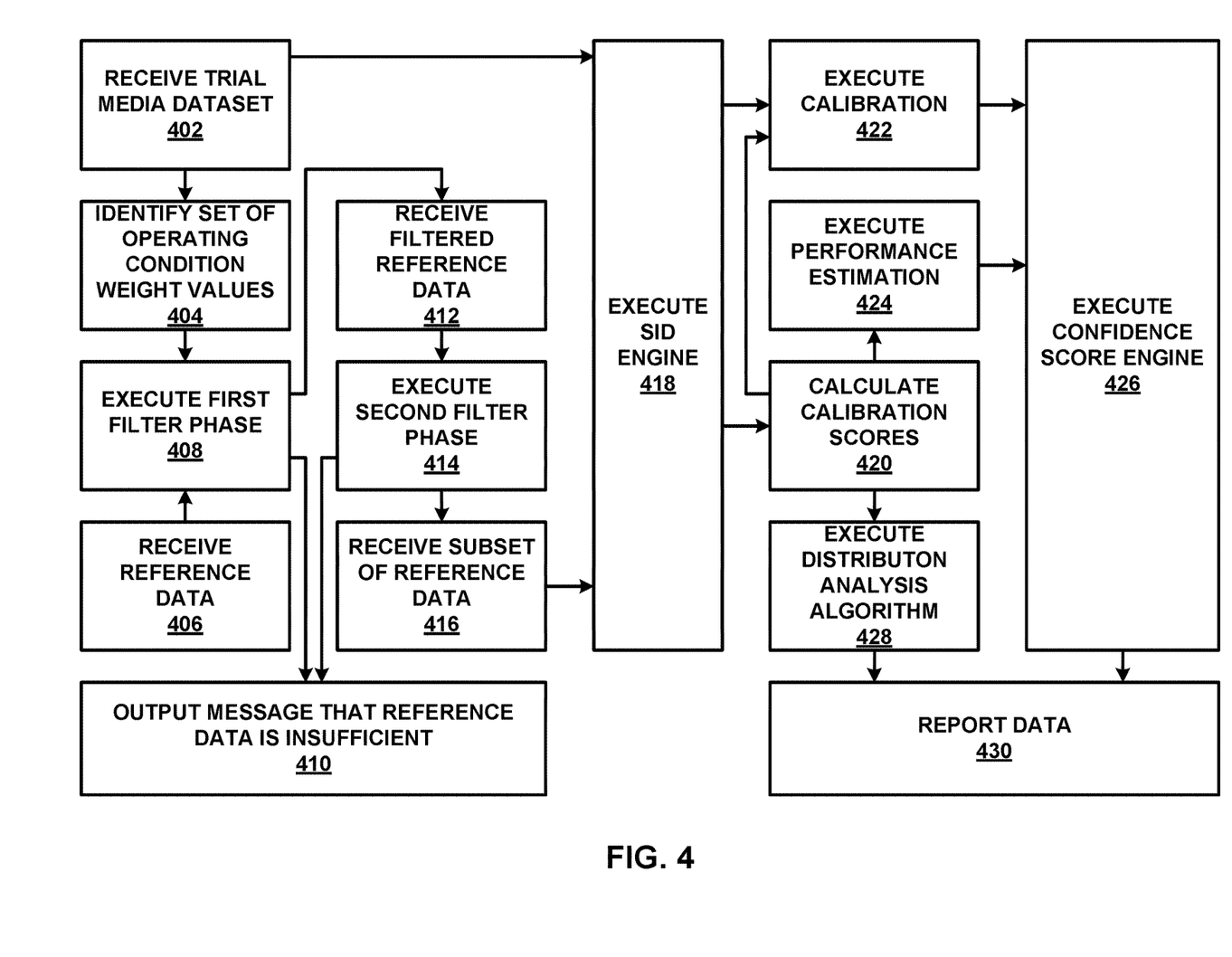
FIG. 4 is a flow diagram illustrating an example operation for calculating a probability that a trial media dataset includes media samples associated with the same object, in accordance with one or more techniques described herein.

FIG. 4 is a flow diagram illustrating an example operation for calculating a probability that a trial media dataset includes media samples associated with the same object, in accordance with one or more techniques described herein. For convenience, FIG. 4 is described with respect to computing system 100 of FIG. 1. However, the techniques of FIG. 4 may be performed by different components of computing system 100 or by additional or alternative devices.

Computing system 100 may receive information indicative of a trial media dataset (402). In some examples, the trial media dataset may represent one of trial media datasets 160. The trial media dataset may include a first media sample and a second media sample, where the first media sample is known to be associated with an object and an object association of the second media sample is unknown. Condition analysis model 112 may identify a set of operating condition weight values (404) associated with the trial media dataset. In some examples, condition analysis model 112 may identify the set of operating condition weight values associated with the trial media dataset based on known associations between the reference media datasets 152 and the sets of reference operating condition weight values 154. In some examples, condition analysis model 112 may represent a machine learning model, and computing system 100 may train the condition analysis model 112 using the reference media datasets 152 and the sets of reference operating condition weight values 154, but this is not required. In some examples, condition analysis model 112 represents a linear regression model that does not perform machine learning.

In some examples, to select a subset of reference data, condition analysis model 112 may receive reference data 150 (406) and execute a first filter phase (408). In some examples, by executing the first filter phase, condition analysis model 112 may eliminate one or more reference media datasets of reference media datasets 152 from being selected as one of a subset of reference media datasets. Condition analysis model 112 may eliminate these one or more reference media datasets based on the one or more reference media datasets not being sufficiently similar to the trial media dataset. In the first filter phase, condition analysis model 112 may compare the set of operating condition weight values associated with the trial media dataset with the set of reference operating condition weight values corresponding to each reference media dataset of the plurality of reference media datasets 152. In some examples, condition analysis model 112 may generate a plurality of similarity values, where each similarity value of the plurality of similarity values corresponds to a similarity between the set of operating condition weight values for the trial media dataset and a respective set of reference operating condition weight values of the plurality of sets of reference operating condition weight values 154. Condition analysis model 112 may compare each similarity value of the plurality of similarity values to a threshold similarity value in order to determine whether to exclude the respective reference media dataset from the subset of reference media datasets.

Based on executing the first filter phase, condition analysis model 112 may determine whether there are a large enough number of reference media datasets in the plurality of reference media datasets 152 even when one or more reference media datasets are eliminated from being selected for the subset of reference media datasets. When condition analysis model 112 determines that there are not a large enough number of reference media datasets in the plurality of reference media datasets, condition analysis model 112 may output a message indicating that the reference data 150 is insufficient for calibrating the trial media dataset (410). This indication may be interpreted as a capability of the model to correctly verify objects in the trial media dataset. For example, the indication may include an error rate. An error rate may indicate a rate at which the model will incorrectly verify objects in the trial media dataset (e.g., incorrectly identify an object associated with at least one media sample in the trial media dataset). A confidence interval may represent a percentage or ratio value which indicates a predicted accuracy of the model in verifying trial media datasets over a plurality of trials.

Condition analysis model 112 may, in some cases, output information indicative of a request to augment the plurality of reference media datasets with one or more additional reference media datasets having characteristics similar to the characteristics of the trial media dataset. Condition analysis model 112 may determine the characteristics based on the set of operating condition weight values associated with the trial media dataset. In some examples, when there is a large enough number of reference media datasets in the plurality of reference media datasets 152 even when one or more reference media datasets are eliminated from being selected for the subset of reference media datasets, the condition analysis model 112 may receive filtered reference data (412). The filtered reference data may include each reference media dataset of the plurality of reference media datasets 152 that was not excluded during the first filter phase.

Based on receiving the filtered reference data, Condition analysis model 112 may execute a second filter phase (414). In some examples, the second filter phase further refines the reference data by eliminating more reference media datasets from being selected for the subset of reference media datasets for calibration. In some examples, condition analysis model 112 may apply condition probabilistic linear discriminant analysis (CPLDA), which may be multi-condition PLDA, in order to select the subset of reference media datasets from the filtered reference data. Condition analysis model 112 may further refine the filtered reference data based on the set of operating condition weight values associated with the trial media dataset. For example, condition analysis model 112 may compare the set of operating condition weight values with each set of reference operating condition weight values associated with a reference media dataset in the filtered data. To compare the set of operating condition weight values with a respective set of reference operating condition weight values, condition analysis model 112 may compare each operating condition weight value of the set of operating condition weight values with a respective weight value of the set of reference operating condition weight values. Condition analysis model 112 may calculate a comparison value based on a variance value corresponding to each respective comparison of weight values. For example, condition analysis model 112 may calculate a variance value corresponding to a first weight value of the set of operating condition weight values and a first weight value of the set of reference operating condition weight values, where both of the first weight value of the set of operating condition weight values and the first weight value of the set of reference operating condition weight values are associated with the same operating condition. Condition analysis model 112 may calculate a variance value for each respective pairing of weight values. Based on the set of variance values that condition analysis model 112 calculates when comparing the set of operating condition weight values and the set of reference operating condition weight values, condition analysis model 112 may determine whether to select the reference media dataset corresponding to the set of reference operating condition values for the subset of reference data.

When condition analysis model 112 executes the second filter phase in order to further refine the filtered reference data, condition analysis model 112 may determine whether a number of reference media datasets selected for the subset of reference data is greater than a threshold number of reference media datasets. When the number of reference media datasets selected for the subset of reference data is greater than or equal to the threshold number of reference media datasets, condition analysis model 112 may determine that the subset of reference data is sufficient for determining whether the trial media dataset includes media samples from the same object. When the number of reference media datasets selected for the subset of reference data is less than the threshold number of reference media datasets, condition analysis model 112 may determine that the subset of reference data is insufficient for determining whether the trial media dataset includes media samples from the same object. Based on determining that the subset of reference data is insufficient, condition analysis model 112 may output a message that the subset of reference data is insufficient (410). Based on determining that the subset of reference data is sufficient, condition analysis model 112 may receive the subset of reference data (416) selected by condition analysis model 112 for calibrating the trial media dataset.

Calibration model 116 may execute SID Engine (418) in order to calculate a set of calibration scores (420) based on the subset of reference data selected by condition analysis model 112. In some examples, each calibration score of the set of calibration scores calculated by calibration model 116 may correspond to a reference media dataset of the subset of reference media datasets. Each calibration score may indicate a level of similarity (e.g., a similarity value) between the set of operating condition weight values for the trial media dataset and the respective set of reference operating condition weight values.

In some examples, by executing the second filter phase, condition analysis model 112 may identify one or more reference media datasets of the filtered reference data. In some examples, the second filter phase may include a trial-based calibration (TBC) algorithm. By executing the second filter phase, condition analysis model 112 may search the filtered reference data to select a subset of reference data that includes characteristics similar to characteristics of one or both of the first media sample and the second media sample of the trial media dataset. In some examples, condition analysis model 112 may determine, based on executing the second filter phase, that the reference data is insufficient for correctly determining whether the trial media dataset includes media samples associated with the same object. Based on determining that the reference data 150 is insufficient, condition analysis model 112 may output a message that the reference data 150 is insufficient (410).

Calibration model 116 may execute calibration (422) based on the trial media dataset, the subset of reference data, and the set of calibration scores. By executing calibration, calibration model 116 may determine whether two or more samples in the trial media dataset are associated with the same object. Calibration model 116 may execute a performance estimation (424).

Calibration model 116 may execute a confidence score engine (426) in order to generate an error rate and a confidence interval associated with the validation of the trial media dataset. In some examples, by executing the confidence score engine, calibration model 116 may predict a discriminative power of a computing system 100. In other words, calibration model 116 may determine how effectively machine learning system 110 determines objects associated with media samples. The error rate may represent a percentage of trials in which machine learning system 110 incorrectly verifies a media dataset. The confidence interval represents a predicted efficacy of machine learning system 110 in verifying media datasets. The error rate and the confidence interval may inform users of a reliability of the mode.

Calibration model 116 may also execute a distribution analysis algorithm (428). Calibration model 116 may report data (430) indicative of a confidence interval, an error rate, the distribution analysis, and the set of calibration scores, any of which may be considered an indication of a capability of the model to correctly verify an object in the media dataset.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:
    a storage device; and
    processing circuitry having access to the storage device and configured to:
        receive information indicative of a media dataset comprising at least one of audio data and image data, wherein the media dataset corresponds to an object;
        analyze the media dataset to compute a corresponding set of operating condition weight values, wherein each operating condition weight value of the set of operating condition weight values corresponds to a different operating condition of a set of operating conditions;
        compare the set of operating condition weight values corresponding to the media dataset with a plurality of sets of reference operating condition weight values that each correspond to a different reference media dataset of a plurality of reference media datasets;
        determine, based on the comparison of the set of operating condition weight values with the plurality of sets of reference operating condition weight values, an indication of a capability of a trained machine learning model to correctly verify the object in the media dataset; and
        perform an action based on the indication.

2. The computing system of claim 1, wherein to compare the set of operating condition weight values with the plurality of sets of reference operating condition weight values, the processing circuitry is configured to:
    compute a plurality of similarity values, wherein each similarity value of the plurality of similarity values corresponds to the set of operating condition weight values and a respective set of reference operating condition weight values of the plurality of sets of reference operating condition weight values; and
    determine a number of sets of reference operating condition weight values corresponding to a similarity value that is greater than a similarity value threshold, and wherein to determine the indication of the capability of the trained machine learning model to correctly verify the object in the media dataset, the processing circuitry is configured to:
   determine whether the number is greater than a threshold number.

3. The computing system of claim 2, wherein based on determining that the trained machine learning model is capable of correctly verifying the object in the media dataset, the processing circuitry is configured to:
   calibrate the media dataset with a set of reference media datasets of the plurality of reference media datasets; and
   verify, based on calibrating the media dataset with the set of reference media datasets, the object in the media dataset.

4. The computing system of claim 3, wherein the processing circuitry is further configured to select the set of reference media datasets from the plurality of reference media datasets so that each reference media dataset of the set of reference media datasets is associated with a respective set of reference operating condition weight values corresponding to a similarity value greater than the similarity value threshold.

5. The computing system of claim 3, wherein the media dataset comprises a first one or more media samples and a second one or more media samples, wherein the first one or more media samples are known to be associated with the object, wherein the second one or more media samples are associated with the object or associated with another object, and wherein to calibrate the media dataset with the set of reference media datasets, the processing circuitry is configured to:
   execute, based on the set of reference media datasets, the trained machine learning model in order to compute a probability that the second one or more media samples is associated with the object; and
   output information indicative of the probability that the second media one or more media samples are associated with the object.

6. The computing system of claim 5,
   wherein each reference media dataset of a first one or more reference media datasets of the set of reference media datasets comprises two or more media samples from the same object,
   wherein each reference media dataset of a second one or more reference media datasets of the set of reference media datasets comprises:
      a first one or more reference media samples from an object; and
      a second one or more reference media samples, wherein each reference media sample of the second one or more reference media samples is from an object different from the object of the first one or more reference media samples, and
   wherein to calibrate the media dataset with the set of reference media datasets of the plurality of reference media datasets, the processing circuitry is configured to:
      execute, based on the first one or more reference media datasets and the second one or more reference media datasets, the trained machine learning model in order to compute the probability.

7. The computing system of claim 1, wherein based on determining that the trained machine learning model is not capable of correctly verifying the object in the media dataset, the processing circuitry is configured to output information indicative of a suggestion to add reference media datasets to the plurality of reference media datasets.

8. The computing system of claim 7, wherein the processing circuitry is further configured to:
   determine one or more operating conditions of the set of operating conditions that are present in the media dataset and are not present in the plurality of reference media datasets; and
   output information indicative of a suggestion to add the reference media datasets comprising the one or more operating conditions that are present in the media dataset and are not present in the plurality of reference media datasets.

9. The computing system of claim 7, wherein the plurality of reference operating condition weight values is a first plurality of reference operating condition weight values, wherein the indication is a first indication, and wherein the processing circuitry is further configured to:
   receive a confirmation that one or more additional reference media datasets are added to the plurality of reference media datasets;
   compare the set of operating condition weight values corresponding to the media dataset with a second plurality of reference operating condition weight values corresponding to the plurality of reference media datasets including the one or more additional reference media datasets; and
   determine, based on the comparison of the set of operating condition weight values with the second plurality of reference operating condition weight values, a second indication of the capability of the trained machine learning model to correctly verify the object in the media dataset.

10. The computing system of claim 1, wherein each operating condition weight value of the set of operating condition weight values represents a value within a range from a first value to a second value, wherein an operating condition weight value of the first value indicates that the respective operating condition is least present in the media dataset, and wherein an operating condition weight value of the second value indicates that the respective operating condition is most present in the media dataset.

11. The computing system of claim 1, wherein the set of operating conditions include one or more environmental conditions corresponding to an environment of the object.

12. The computing system of claim 1, wherein the media dataset comprises audio data, wherein the object represents a human speaker, and wherein to determine the indication of the capability of the trained machine learning model to correctly verify the human speaker in the media dataset, the processing circuitry is configured to determine a capability of the trained machine learning model to verify that a voice present in the media dataset belongs to the human speaker.

13. The computing system of claim 1, wherein the media dataset comprises image data, wherein the object represents a human individual, and wherein to determine the indication of the capability of the trained machine learning model to correctly verify the human individual in the media dataset, the processing circuitry is configured determine a capability of the trained machine learning model to verify that a human face present in the media dataset belongs to the human individual.

14. The computing system of claim 1, wherein the action comprises adjusting a system parameter to modify application of the machine learning model to the media dataset for verifying the object in the media dataset.

15. The computing system of claim 1, wherein to perform the action, the processing circuitry is configured to determine to not take further action based on the indication.

16. A method comprising:
receiving, by processing circuitry having access to a storage device, information indicative of a media dataset comprising at least one of audio data and image data, wherein the media dataset corresponds to an object;
analyzing, by the processing circuitry, the media dataset to compute a corresponding set of operating condition weight values, wherein each operating condition weight value of the set of operating condition weight values corresponds to a different operating condition of a set of operating conditions;
comparing, by the processing circuitry, the set of operating condition weight values corresponding to the media dataset with a plurality of sets of reference operating condition weight values that each correspond to a different reference media dataset of a plurality of reference media datasets;
determining, by the processing circuitry based on the comparison of the set of operating condition weight values with the plurality of sets of reference operating condition weight values, an indication of a capability of a trained machine learning model to correctly verify the object in the media dataset; and
performing, by the processing circuitry, an action based on the indication.

17. The method of claim 16, wherein comparing the set of operating condition weight values with the plurality of sets of reference operating condition weight values comprises:
computing a plurality of similarity values, wherein each similarity value of the plurality of similarity values corresponds to the set of operating condition weight values and a respective set of reference operating condition weight values of the plurality of sets of reference operating condition weight values; and
determining a number of sets of reference operating condition weight values corresponding to a similarity value that is greater than a similarity value threshold, and wherein determining the indication of the capability of the trained machine learning model to correctly verify the object in the media dataset comprises:
determining whether the number is greater than a threshold number.

18. The method of claim 17, wherein based on determining that the trained machine learning model is capable of correctly verifying the object in the media dataset, the method further comprises:
calibrating, by the processing circuitry, the media dataset with a set of reference media datasets of the plurality of reference media datasets; and
verifying, by the processing circuitry based on calibrating the media dataset with the set of reference media datasets, the object in the media dataset.

19. The method of claim 18, wherein the media dataset comprises a first one or more media samples and a second one or more media samples, wherein the first one or more media samples are known to be associated with the object, wherein the second one or more media samples are associated with the object or associated with another object, and wherein calibrating the media dataset with the set of reference media datasets comprises:
executing, based on the set of reference media datasets, the trained machine learning model in order to compute a probability that the second one or more media samples is associated with the object; and
outputting information indicative of the probability that the second media one or more media samples are associated with the object.

20. A non-transitory computer-readable medium comprising instructions that, when executed by a processor, causes the processor to:
receive information indicative of a media dataset comprising at least one of audio data and image data, wherein the media dataset corresponds to an object;
analyze the media dataset to compute a corresponding set of operating condition weight values, wherein each operating condition weight value of the set of operating condition weight values corresponds to a different operating condition of a set of operating conditions;
compare the set of operating condition weight values corresponding to the media dataset with a plurality of sets of reference operating condition weight values that each correspond to a different reference media dataset of a plurality of reference media datasets;
determine, based on the comparison of the set of operating condition weight values with the plurality of sets of reference operating condition weight values, an indication of a capability of a trained machine learning model to correctly verify the object in the media dataset; and
perform an action based on the indication.

* * * * *